(12) United States Patent
Caroprese

(10) Patent No.: US 10,081,067 B2
(45) Date of Patent: Sep. 25, 2018

(54) SQUARE HOLE SAW

(71) Applicant: Frederick Vincent Caroprese, Yorktown Heights, NY (US)

(72) Inventor: Frederick Vincent Caroprese, Yorktown Heights, NY (US)

( * ) Notice: Subject to any disclaimer, the term of this patent is extended or adjusted under 35 U.S.C. 154(b) by 0 days.

(21) Appl. No.: 15/200,667

(22) Filed: Jul. 1, 2016

(65) Prior Publication Data
US 2017/0001252 A1 Jan. 5, 2017

Related U.S. Application Data

(60) Provisional application No. 62/187,879, filed on Jul. 2, 2015.

(51) Int. Cl.
| | |
|---|---|
| *B23D 49/11* | (2006.01) |
| *B23D 49/00* | (2006.01) |
| *B23B 45/00* | (2006.01) |
| *B23B 51/04* | (2006.01) |
| *B23B 41/04* | (2006.01) |

(52) U.S. Cl.
CPC ............ *B23D 49/11* (2013.01); *B23B 45/003* (2013.01); *B23B 51/04* (2013.01); *B23D 49/003* (2013.01); *B23B 41/04* (2013.01); *B23B 2251/606* (2013.01); *B23B 2265/12* (2013.01); *B23B 2265/322* (2013.01); *Y10T 29/5147* (2015.01); *Y10T 408/348* (2015.01)

(58) Field of Classification Search
CPC . B23B 41/04; B23B 51/08; B27F 5/02; Y10T 408/34; Y10T 408/348; Y10T 408/356; Y10T 29/5147

USPC ............................................................ 7/158
See application file for complete search history.

(56) References Cited

U.S. PATENT DOCUMENTS

| | | | | |
|---|---|---|---|---|
| 3,499,353 | A * | 3/1970 | Ewell | B23B 51/00 408/22 |
| 3,833,311 | A * | 9/1974 | Chailer | B23B 45/00 144/144.1 |
| 3,884,280 | A * | 5/1975 | Chailer | B23B 45/003 144/144.1 |
| 5,048,190 | A | 9/1991 | Aurness et al. | |
| 5,797,189 | A | 8/1998 | Gilbert | |
| 5,853,269 | A * | 12/1998 | Young | B23B 41/04 30/122 |
| 5,867,913 | A | 2/1999 | Pettigrew | |
| 6,565,294 | B1 * | 5/2003 | Young | B23B 41/04 144/73 |

* cited by examiner

*Primary Examiner* — Daniel Howell
*Assistant Examiner* — Yasir Diab
(74) *Attorney, Agent, or Firm* — Dunlap, Bennett & Ludwig PLLC; Brendan E. Squire

(57) ABSTRACT

A tool that cuts a hole for a single or double electric gang" switch" box. By having four blades, all cutting at the same time and in the shape of the switch box, a more accurate and appropriately placed hole may be provided. The hole saw may be configured with two centering drills so the tool is guided into the cut. An eccentric drive mechanism converts a rotary drive into reciprocating movement of perpendicularly opposed pairs of blades to cut a rectangular opening.

10 Claims, 5 Drawing Sheets

SQUARE HOLE SAW

CROSS-REFERENCE TO RELATED APPLICATION

This application claims the benefit of priority of U.S. provisional application No. 62/187,879, filed Jul. 2, 2015 the contents of which are herein incorporated by reference.

BACKGROUND OF THE INVENTION

The present invention relates hole saws, and more particularly to apparatus for cutting a rectangular or square shaped hole.

Currently in the art, it takes too long to cut out rectangular shaped holes, such as for electrical outlet "gang" boxes. When the rectangular hole is cut, it is not accurate, particularly when the users hand is not steady, resulting in a damaged wall or crooked hole. Other such saws are too slow and take tremendous user concentration to maintain the lines drawn on the wall for the hole's placement. Many of these saws are not intended to cut holes for electrical boxes, but have been adapted to do so.

As can be seen, there is a need for an a hole saw having four blades all cutting at the same time in the shape of a square or rectangle, and by using a centering drill but, so the tool is guided into the cut.

SUMMARY OF THE INVENTION

In one aspect of the present invention, a rectangular hole saw is provided having: a housing with a front face, a back face, and at least one sidewall; an eccentric drive mechanism is carried within the housing and is operable to reciprocate a first pair of blade carriers orthogonally relative to a second pair of blade carriers. The eccentric drive mechanism may include a rotary drive shaft having a driven end, proximal to the back face, and a driving end contained within the housing, with an eccentric drive pin carried on the driving end. A first yoke and a second yoke have opposed linear drive ends and an elongate slot defined intermediate the opposed linear drive ends. A first pair of blade slides are reciprocably carried on a first pair of rails disposed in a substantially parallel spaced apart relation. A second pair of blade slides are reciprocably carried on a second pair of rails disposed in a substantially parallel spaced apart relation, orthogonal to the first pair of rails, such that the first pair of blade slides are reciprocably moved by the linear drive ends of the first yoke and the second blade slides are reciprocably moved by the linear drive ends of the second yoke.

In some embodiments, the rectangular hole saw will have a plurality of blade brackets attached to each of the first pair and second pair of blade slides. A first pair of blades may be removably attached to the blade brackets, attached to the first blade carriers and extending outwardly from the front face of the housing. A second pair of blades are removably attached to the blade brackets, which are attached to the second blade carriers and extend outwardly from the front face of the housing. The first pair of blades are disposed in a substantially parallel, spaced apart relation and the second pair of blades are disposed in a substantially parallel spaced apart relation, orthogonal to the first pair of blades.

In other aspects of the invention, the rectangular hole saw may also include at least one drill shaft. The drill shaft includes a first end extending through the front face inwardly from the first and second pair of blades and a second end contained within the housing. A, drill gear is coupled to the second end of the rotary drill shaft via; via a drive gear attached to the rotary drive shaft and cooperatively engaged with the drill gear for rotation therewith. The drill shaft may also include a bit holder operatively coupled to the first end of the drill shaft. More preferably, a drill bit is operatively coupled to the bit holder. The rectangular hole saw of the present invention may also include a plurality of drill shafts disposed diagonally across the drive gear. A handle may be attached to the housing and extends outwardly therefrom.

In yet other aspects of the invention, a rectangular hole saw includes a housing having a front face, a back face, and at least one sidewall; an eccentric drive mechanism is coupled to a rotary drive shaft and is operable to orthogonally reciprocate a first pair of rail mounted blade carriers and a second pair of rail mounted blade carriers. The eccentric drive mechanism includes an eccentric drive pin carried by the rotary drive shaft; and a first yoke and a second yoke each having opposed drive ends and an elongate slot defined intermediate the opposed drive ends; wherein the eccentric drive pin is received in the elongate slot of the first yoke and the second yoke. The first pair of blade slides are reciprocably displaced by the drive ends of the first yoke and the second blade slides are reciprocably displaced by the linear drive ends of the second yoke.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a hole saw for cutting a rectangular hole in the surface of a substrate material. The hole saw may be operatively coupled to a rotary drive motor, such as a drill, a drill press, a grinder, and the like.

Figure 1:
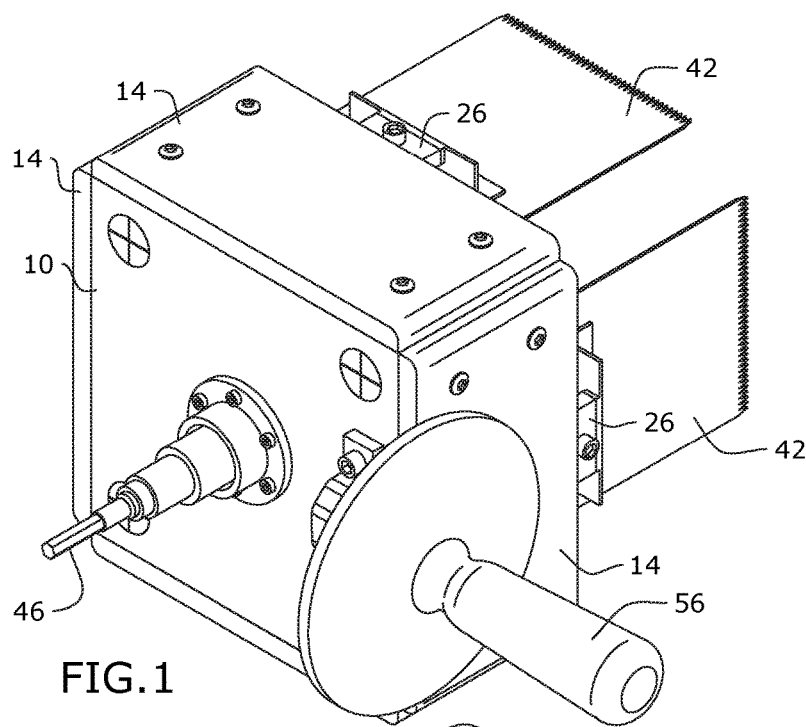
FIG. 1 is rear perspective view of rectangular hole saw.
Figure 2:
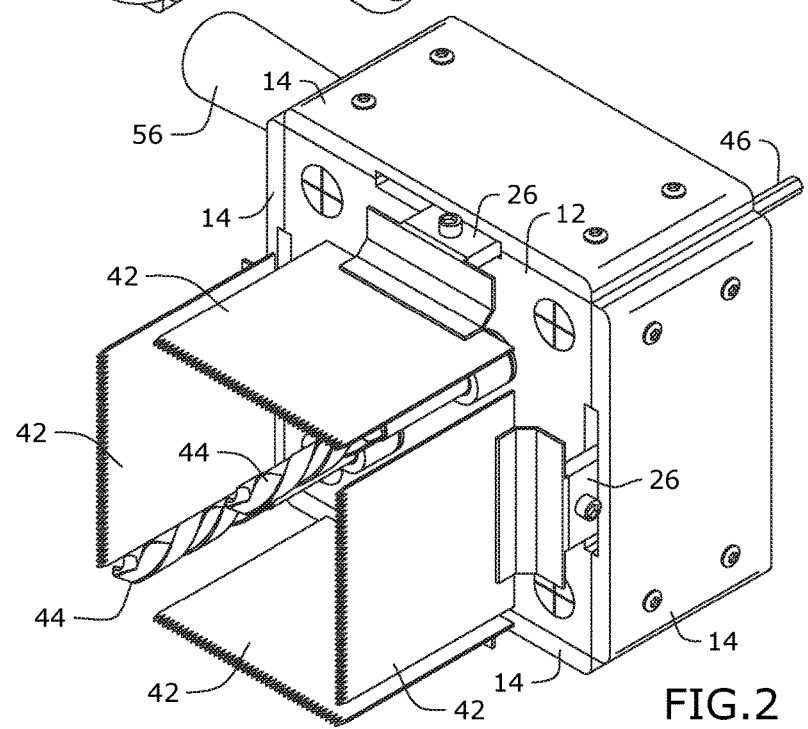
FIG. 2 is a front perspective view of the rectangular hole saw.

As seen in reference to FIGS. 1 and 2, a rectangular hole saw of the present invention includes a housing having a front face 12, a back face 10, and at least one sidewall 14. A first pair of blades 42 are removably attached to a blade bracket 26 and are oriented in a first direction with the first pair of blades 42 aligned in a substantially parallel relationship. A second pair of blades 42' are removably attached to a blade bracket 26 and are oriented in a second direction, orthogonal to the first direction, with the second pair of blades 42' also aligned in a substantially parallel relationship. The blades 42, 42' have a cutting end that extend outwardly from the front face 12 and are generally perpendicular to the front face. The blades 42, 42' will also have an attachment end opposite the cutting end. The attachment end may be laterally offset from the cutting end so that, by selection of the length of the offset, a rectangular hole of differing lateral and longitudinal lengths may be cut by the rectangular hole saw.

The rectangular hole saw is configured to translate a rotary drive input via an input drive shaft 46 to reciprocating action of the first pair of blades 42 and the second pair of blades. The input drive shaft may be coupled to a drill, a drill press, a grinder, or other rotary motor source. The housing may also include a handle 56 extending from the housing to permit the user to hold and stabilize the hole saw when cutting a hole therewith.

Figure 3:
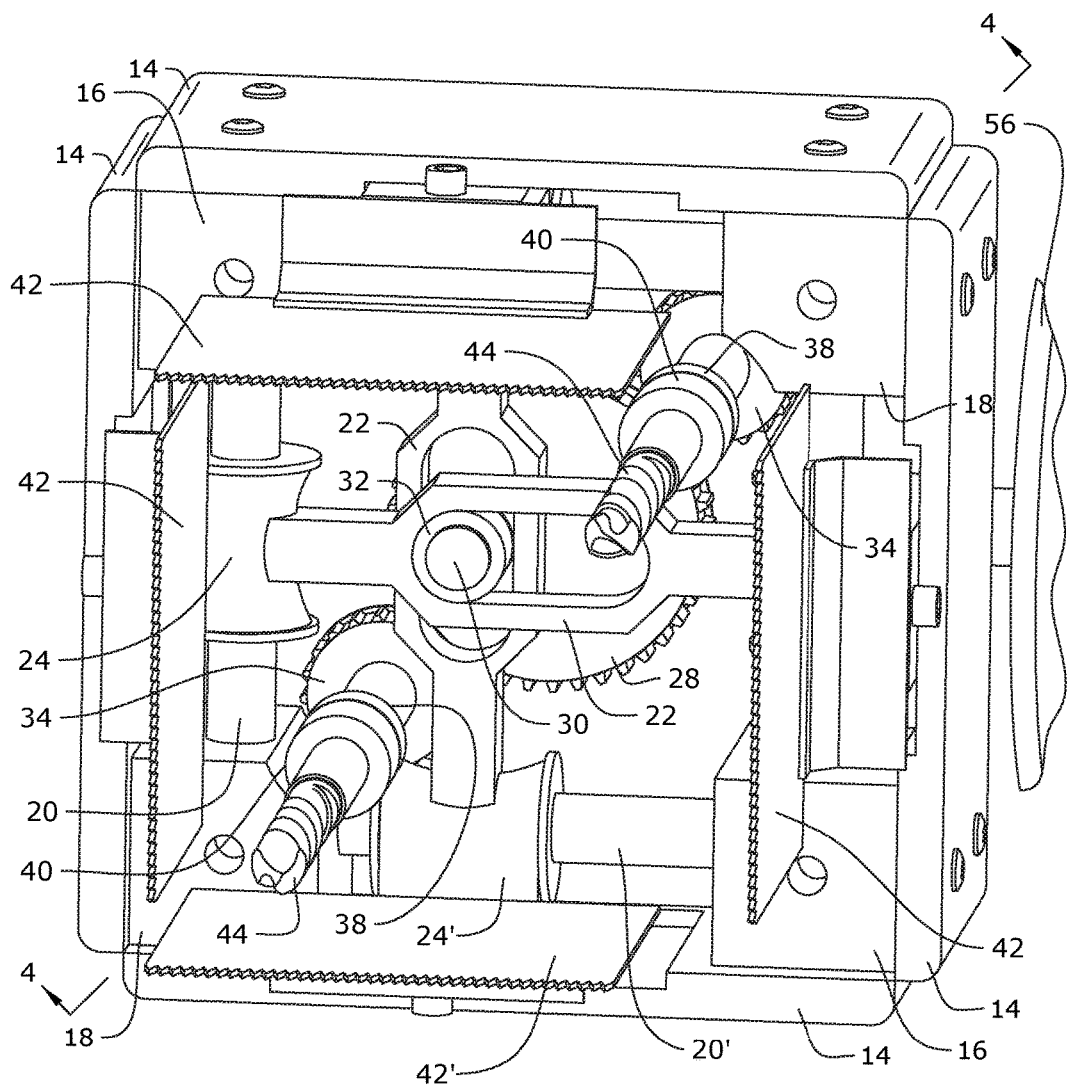
FIG. 3 is a front perspective view of the rectangular hole saw with multiple components omitted for illustrative clarity of internal components.
Figure 4:
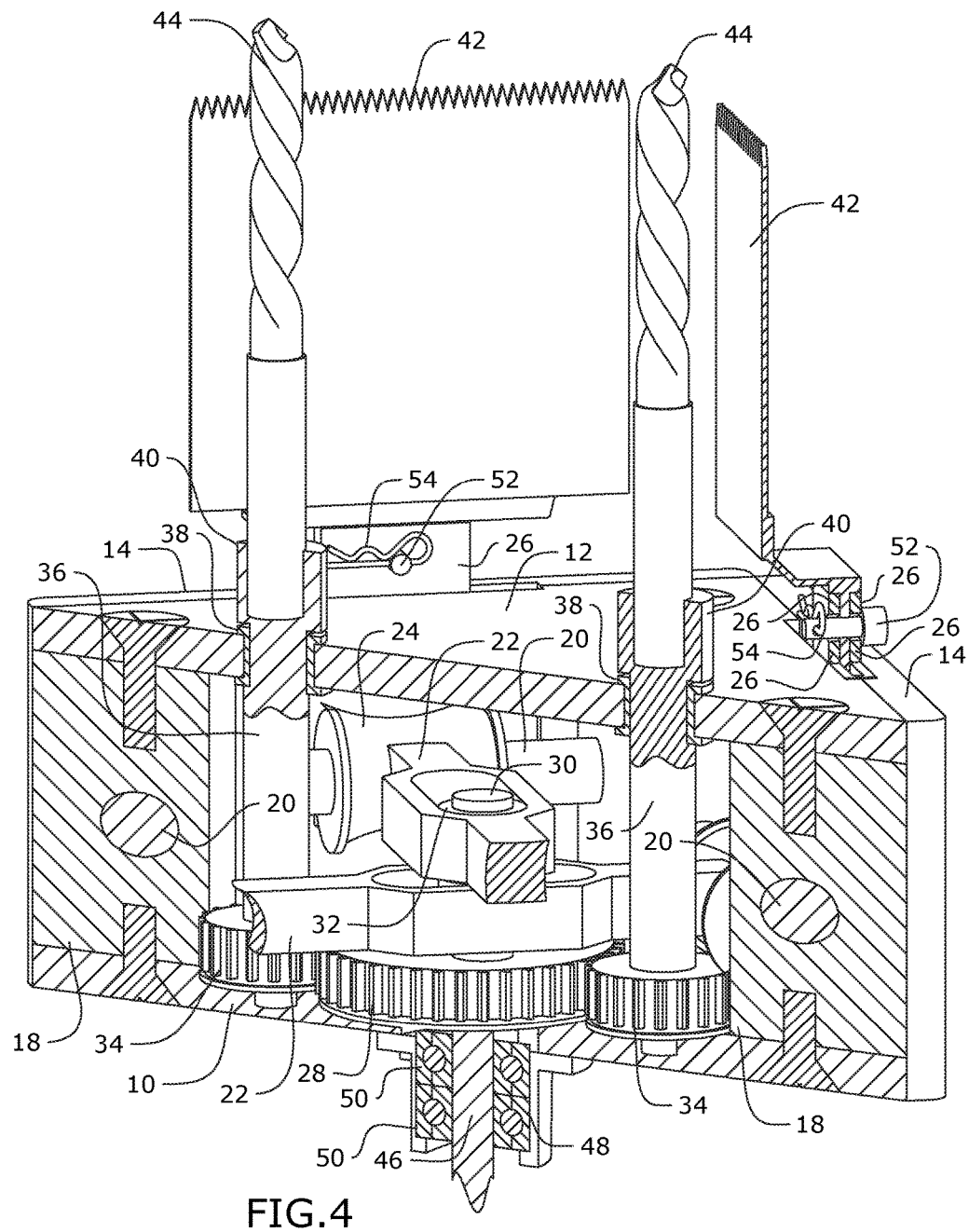
FIG. 4 is a cutaway perspective view of the rectangular hole saw along line 4-4 in FIG. 3.
Figure 5:
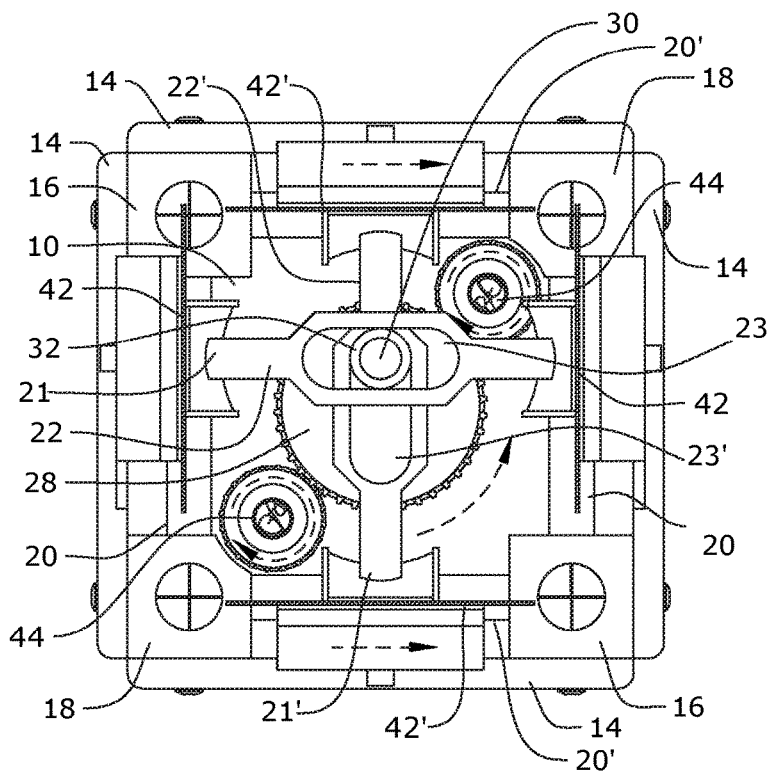
FIG. 5 is a front view of the invention with multiple components omitted for illustrative clarity of internal components and shown item 28 at an exemplary initial orientation.

As seen in reference to FIGS. 3 and 4, the rectangular hole saw will also include an eccentric drive mechanism carried within the housing. The eccentric drive mechanism is operable to translate the rotary input via input drive shaft 46 to reciprocate a first pair of blade carriers 24 orthogonally relative to a second pair of blade carriers 24'. The eccentric drive mechanism includes a rotary drive shaft 46 having a driven end proximal to the back face 10 and a driving end 28 contained within the housing. The drive shaft 46 may be supported by one or more bearings 50 carried in a bearing housing 48.

In some embodiments, the eccentric drive mechanism is provided an eccentric drive pin 30 carried on the driving end. The eccentric drive mechanism may also include a first yoke 22 having opposed drive ends 21 and an elongate slot 23 defined intermediate the opposed drive ends 21. The eccentric drive mechanism may also include a second yoke 22' having opposed drive ends 21' and an elongate slot 23' defined intermediate the opposed drive ends 22'. The eccentric drive pin 30 is received in the elongate slot 23, 23' of the first yoke and the second yoke. A bushing 32 may also be provided between the eccentric drive pin 30 and the elongate slots 23, 23'. The first and second yokes 22 22' are oriented in a substantially orthogonal relationship to each other.

In further reference to FIG. 3, a first pair of blade slides 24 are reciprocably carried on a first pair of rails 20 disposed in a substantially parallel spaced apart relation within the housing. A second pair of blade slides 24' are reciprocably carried on a second pair of rails 20', also disposed in a substantially parallel spaced apart relation to each other and orthogonal to the first pair of rails 20. The first pair of blade slides 24 are reciprocably moved by the drive ends 21 of the first yoke 22 and the second blade slides 24' are reciprocably moved by the drive ends 21' of the second yoke 22'.

A blade bracket 26 is attached to each of the first pair and second pair of blade slides 24, 24' to removably attach the blades 42, 42' to the blade slides 24, 24'. As seen in reference to FIG. 4, the brackets 26 may be attached to the blade slides 24, 24' via a fastener 52 received through aligned apertures in the blade bracket 26 and an attachment end of the blades 42, 42'. The fastener may be a pin 52 that has a head end may also have a clevis pin 54 to retain the pin 52 in an attaching relationship. Alternatively, the fastener 52 may be a screw or bolt, or similar configuration.

In other embodiments, the hole saw may also include at least one drill bit 44 to provide a centering orientation of the hole saw when a rectangular hole is being cut with the saw. The drill bit 44 is driven by at least one rotary drill shaft 36 having a first end with a bit holder 40 that may extend through or receive a bit 44 through the front face 12 of the housing. A drill gear 34 is operatively coupled to the second end of the rotary drill shaft 36. In this case, a drive gear 28 is attached to the rotary drive shaft 46 and cooperatively engaged with the drill gear 34 for rotation therewith. In this case, the eccentric drive pin 30 may extend from a face of the drill gear 34. In a preferred embodiment, a plurality of drill shafts 36, 36' are disposed diagonally across the drive gear 28.

Referring now to FIGS. 5-8, the operation of the rectangular hole saw is illustrated and described. Beginning with the eccentric drive pin 30 located in a topmost, or 12:00 o'clock position, the first set of blades 42, carried on their respective blade carriers 24, through cooperative engagement with the drive ends 21 with the blade carrier 24 will be positioned at a first vertical limit of travel along the rails 20 for the first set of reciprocating blades 42. The second set of blades 42', carried on their respective blade carriers 24', through cooperative engagement of the drive ends 21' with the blade carrier 24' will be positioned at a center position, intermediate their lateral limits of travel.

Figure 6:
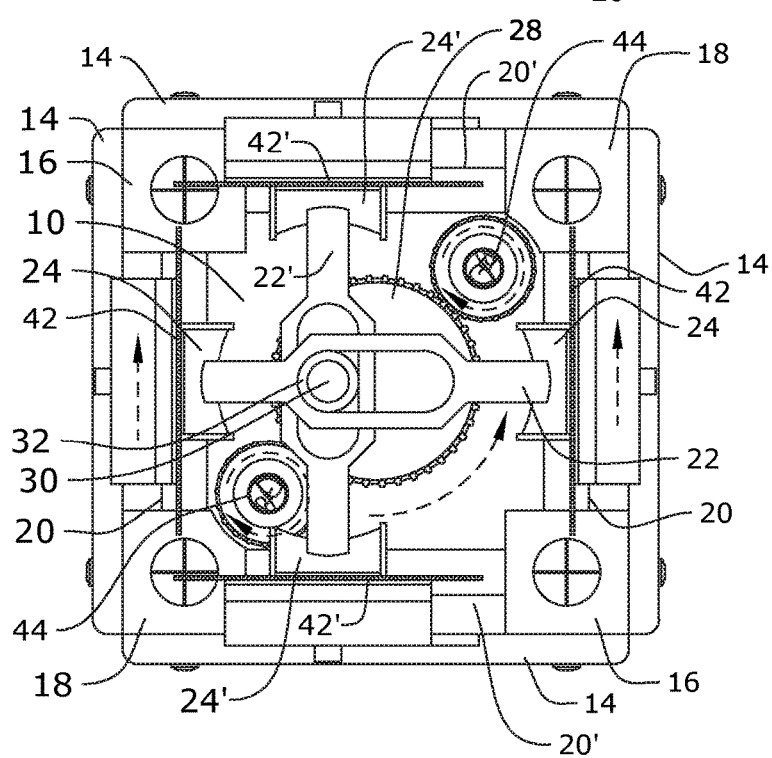
FIG. 6 is a front view of the invention with multiple components omitted for illustrative clarity of internal components and shown item 28 at an exemplary secondary orientation (90 degrees relative to FIG. 5).

As seen in reference to FIG. 6, with rotation of the rotary drive shaft 46 in a counter clockwise direction, the eccentric pin 30 and bushing 32 engage with the elongate slots 23, 23' to displace the yokes 22, 22' and thereby the blade carriers 24, 24' along the rails 20, 20'. In this instance, the second set of blades 42' will be displaced to a first lateral limit of travel by engagement of the drive ends 21' with the blade carriers 24'. The first set of blades 42 will have been displaced from their vertical limit of travel to a centered, intermediate length of travel by the cooperative engagement of the yoke drive ends 21 with the blade carriers 20.

Figure 7:
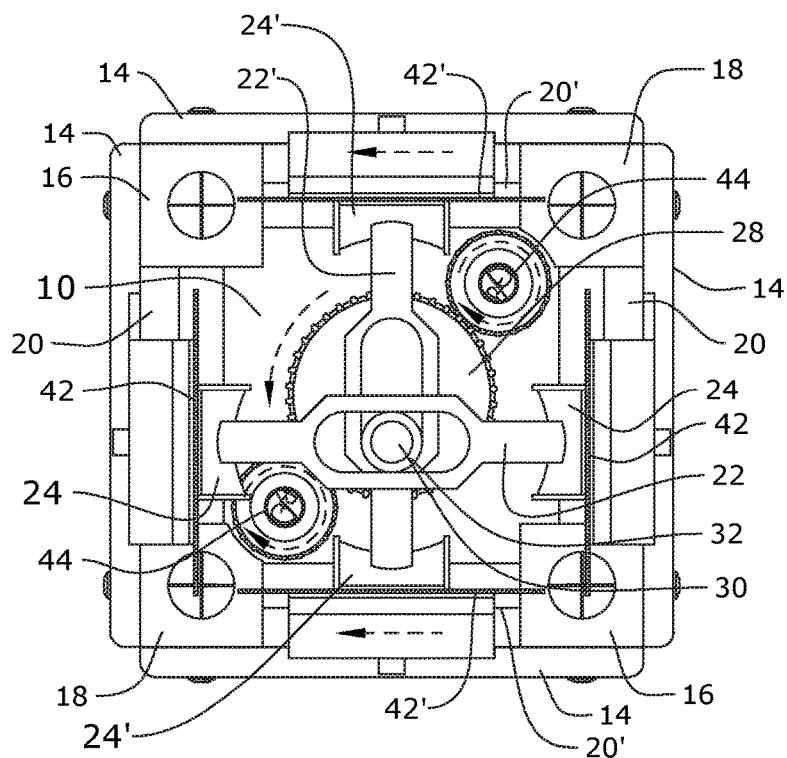
FIG. 7 is a front view of the invention with multiple components omitted for illustrative clarity of internal components and shown item 28 at an exemplary tertiary orientation (90 degrees relative to FIG. 6).

As seen in reference to FIG. 7, the eccentric drive pin 30 has continued to rotate with the rotary drive shaft 46 in a counter clockwise direction to a 6:00 o'clock position. At the 6:00 o'clock position, the first set of cutting blades 42 have been positioned to a second vertical limit of travel by virtue of the first yoke 22 having been displaced by the eccentric pin 30. The second yoke 22' has returned to a centered position, intermediate its' lateral limits of travel.

Figure 8:
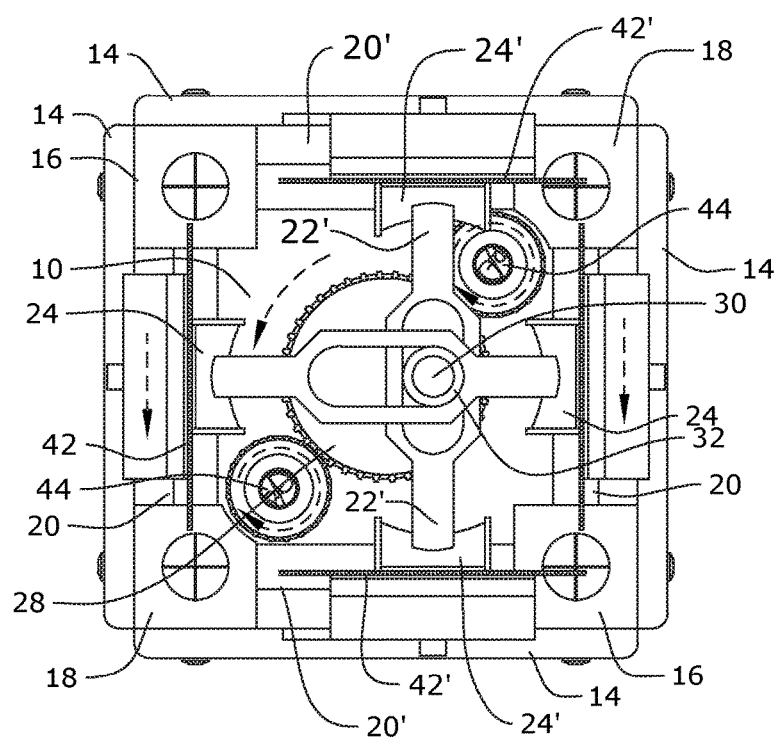
FIG. 8 is a front view of the invention with multiple components omitted for illustrative clarity of internal components and shown item 28 at an exemplary quaternary orientation (90 degrees relative to FIG. 7).

Proceeding next in reference to FIG. 8, continued rotation of the rotary drive shaft 46 in a counter clockwise direction displaces the eccentric drive pin 30 to a 3:00 o'clock position. At this point, the first set of blades 42 have returned to a centered position, intermediate its vertical limits of travel. The second set of blades 42' are not positioned at a second lateral limit of travel.

In embodiments of the rectangular hole saw with one or more drill bits, the rotary drive shaft 46 is provided with a driving gear 28 for cooperative engagement with a drill gear 34. As the driving gear 28 rotates, it engages with the drill gear 34 and imparts a rotation in drill shaft 36.

It should be understood, of course, that the foregoing relates to exemplary embodiments of the invention and that modifications may be made without departing from the spirit and scope of the invention as set forth in the following claims.

What is claimed is:

1. A rectangular hole saw, comprising:
   a housing having a front face, a back face, and at least one sidewall;
   an eccentric drive mechanism carried within the housing operable to reciprocate a first pair of blade carriers orthogonally relative to a second pair of blade carriers, the eccentric drive mechanism comprising;
   a rotary drive shaft having a driven end proximal to the back face and a driving end contained within the housing with an eccentric drive pin carried on the driving end,
   a first yoke having opposed linear drive ends and an elongate slot defined intermediate the opposed linear drive ends;
   a second yoke having opposed linear drive ends and an elongate slot defined intermediate the opposed linear drive ends, wherein the eccentric drive pin is received in the elongate slot of the first yoke and the second yoke,
   the first pair of blade carriers reciprocably carried on a first pair of rails disposed in a substantially parallel spaced apart relation;
   the second pair of blade carriers reciprocably carried on a second pair of rails disposed in a substantially parallel spaced apart relation orthogonal to the first pair of rails,
   wherein the first pair of blade carriers are reciprocably moved by the linear drive ends of the first yoke and the second blade carriers are reciprocably moved by the linear drive ends of the second yoke.

2. The rectangular hole saw of claim 1, further comprising:
   a blade bracket attached to each of the first pair and second pair of blade carriers.

3. The rectangular hole saw of claim 2, further comprising:
   a first pair of blades removably attached to the blade brackets attached to the first blade carriers and extending outwardly from the front face of the housing; and
   a second pair of blades removably attached to the blade brackets attached to the second blade carriers and extending outwardly from the front face of the housing.

4. The rectangular hole saw of claim 3, wherein the first pair of blades are disposed in a substantially parallel spaced apart relation and the second pair of blades are disposed in a substantially parallel spaced apart relation, orthogonal to the first pair of blades.

5. The rectangular hole saw of claim 1, further comprising:
   a drill shaft comprising:
   a first end extending through the front inwardly from the first and second and a second end contained within the housing,
   a drill gear coupled to the second end of the rotary drill shaft; and
   a drive gear attached to the rotary drive shaft and cooperatively engaged with the drill gear for rotation therewith.

6. The rectangular hole saw of claim 5, further comprising:
   a bit holder operatively coupled to the first end of the drill shaft.

7. The rectangular hole saw of claim 6, further comprising:
   a drill bit operatively coupled to the bit holder.

8. The rectangular hole saw of claim 7, further comprising:
   a plurality of drill shafts disposed diagonally across the drive gear.

9. The rectangular hole saw of claim 8, further comprising:
   a handle attached to the housing and extending outwardly therefrom.

10. A rectangular hole saw, comprising:
    a housing having a front face, a back face, and at least one sidewall;
    an eccentric drive mechanism coupled to a rotary drive shaft operable to orthogonally reciprocate a first pair of rail mounted blade carriers and a second pair of rail mounted blade carriers, the eccentric drive mechanism comprising;
    an eccentric drive pin carried by the rotary drive shaft; and
    a first yoke and a second yoke each having opposed drive ends and an elongate slot defined intermediate the opposed drive ends; wherein the eccentric drive pin is received in the elongate slot of the first yoke and the second yoke;
    wherein the first pair of blade carriers are reciprocably displaced by the drive ends of the first yoke and the second blade carriers are reciprocably displaced by the linear drive ends of the second yoke.

* * * * *